United States Patent [19]
Jahren

[11] Patent Number: 5,343,341
[45] Date of Patent: Aug. 30, 1994

[54] METHOD FOR SEEKING THE CENTER OF A RECORDED DATA TRACK

[75] Inventor: Rolf Jahren, Oslo, Norway

[73] Assignee: Tandberg Data A/S, Oslo, Norway

[21] Appl. No.: 962,320

[22] Filed: Oct. 15, 1992

[51] Int. Cl.$^5$ .............................................. G11B 5/584
[52] U.S. Cl. .................. 360/77.12; 360/77.1; 360/78.2
[58] Field of Search ............... 360/77.13, 75, 78.06, 360/78.02, 78.04, 77.05, 70, 77.01, 77.12; 369/53

[56] References Cited

U.S. PATENT DOCUMENTS

| 4,868,692 | 9/1989 | Nakase et al. | 360/77.16 |
| 4,904,938 | 2/1990 | O'Reilly et al. | 324/212 |

FOREIGN PATENT DOCUMENTS

| 0148999 | 7/1985 | European Pat. Off. |
| 0155817 | 9/1985 | European Pat. Off. |
| 0387104 | 9/1990 | European Pat. Off. |

*Primary Examiner*—Aristotelis Psitos
*Assistant Examiner*—James T. Wilson
*Attorney, Agent, or Firm*—Hill, Steadman & Simpson

[57] ABSTRACT

A method for seeking the center of a data track recorded on a magnetic tape using a read head, having an accuracy which is not limited by the stepper mechanism which positions the read head relative to the tape, makes use of the discovery that the fundamental component of tape wander is independent of the tape cartridge vendor and the tape length, and therefore the tape wander can be averaged over an integral number of tape wander periods. In the method, the average output from a read head over an integral number of tape wander periods is found at the lower and upper edges of a data track. The read head output from the center of the track is then measured, and is used to calculate an output change versus head position when the read head is partially in the track. The output change versus head position is then used to scale the lower or upper edge position to a position which would result in an output equal to the output found for the opposite edge, and then the center of the track can be found by dividing the sum of one edge position plus the corrected position for the opposite edge by two.

5 Claims, 1 Drawing Sheet

METHOD FOR SEEKING THE CENTER OF A RECORDED DATA TRACK

BACKGROUND OF THE INVENTION

1. Field of the Invention

The present invention is directed to a method for seeking the center of a recorded data track on a tape with an accuracy which is not limited by the stepper mechanism resolution of the head positioning apparatus and is also not limited by tape wander, thereby permitting data tracks to be recorded on a tape with higher track density.

2. Description of the Prior Art

One factor limiting the data track density (i.e., the closeness of adjacent data tracks) on a magnetic tape is the ability of the drive system to reliably position a write or read head relative to a selected data track, so that data is accurately written on, or read from, the correct data track. Head positioning systems are known which use a so-called "edge seek" technique, wherein a read head is moved perpendicularly to a data track, i.e., toward an edge thereof, and when an output from the read head exceeds a predetermined threshold, the read head is assumed to be over the track. At least two accuracy-limiting factors exist in the use of this known technique. First, the read head is not moved in a continuous path toward the tape edge, but is moved in steps by a head stepping mechanism. The accuracy with which the position of the tape edge can be determined is, therefore, limited by the size of the step with which the read head is moved. Another source of error is tape wander error. This results from the continuous movement of the tape in a direction perpendicular to the direction of tape transport, which results from unavoidable, slight wobbling of the drive reel and the take-up reel and the tape capstans. Since these components must be mounted so as to permit rotation thereof, there is always some unavoidable play in the bearings of those components, causing such wobble. This results in the tape exhibiting a slight undulating motion relative to any stationary point of reference. This also results in so-called tape slope error, in systems in which separate read and write heads are used. The read and write heads must necessarily be spaced a slight distance from each other, with their respective centers being aligned on a straight line. Due to the slight slope of the tape relative to this straight line, caused by the undulating path of the tape due to tape wander, even if the read head accurately identifies the location of the track edge, the track edge will not be precisely at that position when it reaches the write head since the tape is canted at a slight angle relative to the straight line between the centers of the write and read heads.

Given a finite tape width (i.e., the extent of the tape in the direction perpendicular to the direction of tape transport), it is desirable to pack as much data therein as possible, which means having as many data tracks as possible within that width. The number of data tracks for a given tape width is referred to as the track density. The ability to achieve higher track densities is directly related to the ability to accurately identify the location of a data track, both for writing and reading data. Regardless of the density with which data can be written on a tape, if a desired track cannot be identified and reliably read by the read head as the tape is moving past the read head, the data cannot be accurately retrieved.

As noted above, the search algorithm known in the prior art typically searches for the lower edge and/or the upper edge of a selected data track by monitoring for which step position the output from the read head is above or below a specified threshold. The threshold is typically chosen so that 10% to 50% of the read head is over the track being read when the threshold is reached. In systems wherein both the lower and upper edges of the data track are found, the center of the data track is then calculated as the position midway between the lower and upper edge positions. The accuracy of such systems has, therefore, not been significantly affected by the quality of the read output from the track, but has been limited by the resolution of the stepping mechanism (the size of each step) and the dynamic vertical (perpendicular) movements of the tape (tape wander) during the seeking operation. The accuracy of position identification has been limited by the stepping resolution because, when comparing the read head output with the fixed threshold in a threshold comparator, it is not possible to determine whether the output at the preceding step was actually closer to the threshold level than the step which actually puts the output over the threshold level. For example, the read head could be positioned just short of the edge of a selected data track and generate an output which would be below the threshold, and then when moved by the finite step of the stepper mechanism, the next position of the head can cause the threshold to be significantly exceeded. It is this step which would be interpreted as corresponding to the edge position, whereas the read head would have actually been positioned closer to the edge at the preceding step.

Tape wander also has contributed to error, because it has heretofore not been possible to measure the average output of the read head, and thereby averaging the tape wander and taking it into account. This has resulted, in known systems, in the lower and upper track edges being identified as the extreme uppermost or extreme lowermost positions of the track in its undulating path.

In conventional systems, the stepping resolution has typically been in the range of 5 to 10 $\mu$m (0.196 to 0.394 mil), and tape wander is specified to be a maximum of $\pm 12.7$ $\mu$m ($\pm 0.5$ mil).

SUMMARY OF THE INVENTION

It is an object of the present invention to provide a method for seeking the center of a recorded data track on a tape, with an accuracy which is not limited by the stepper mechanism resolution nor by tape wander.

It is a further object of the present invention, by providing a more accurate method for seeking the center of a recorded data track, to permit data tracks to be recorded with increased density on a tape of given width. The method is based on the perception that the fundamental component of tape wander at the beginning and end of a tape is independent of the cartridge vendor and independent of the tape length. The tape wander can, therefore, be averaged effectively by choosing an average length corresponding to an integral number of tape wander periods. To do so, the magnetic read head is positioned relative to the lower and upper edges of the data track at a location at which it is known the read head will be slightly over the track for an entire period of tape wander. The position of the read head, and the gain of the read electronics, can be adjusted in a manner so that the read electronics is not saturated over the period of tape wander. With the read head positioned at these two positions, the respective outputs from the track at those positions are measured over an integral number of tape wander periods.

An average position of the track is thereby found with a high accuracy over a relatively short distance. This results in four variables being obtained: Lower Edge Position (LEP), Lower Edge Output (LEO), Upper Edge Position (UEP) and Upper Edge Output (UEO). LEP and UEP are respectively the positions of the read head just over the upper and lower edges of the tracks, obtained by position signals from the stepping mechanism. LEO and UEO are the respective read head outputs at those positions. Additionally, the read head is positioned at a location approximately at the center of the data track, and its output at that location is a variable referred to as Center Output (CO). Since the width of the read head element is known, the output change versus position when the read head is partially over the data track is found as:

Output versus Position=Center Output/Read Head Width

Either UEP or LEP can then be corrected for the difference in output versus the output at the opposite edge. For example, UEP can be corrected as follows:

Corrected UEP=UEP+(UEO−LEO)/Output versus Position.

In this example, the upper edge position is corrected to a position which would have resulted in the same output as found at the lower edge. The variables UEO, LEO and Output versus Position are used to calculate an upper edge position which is symmetrically into the track relative to the lower position. The corrected upper position is thus found independently of the stepper mechanism resolution. The center position is then calculated as:

Center Position=(LEP+Corrected UEP)/2.

Further details are set forth in the following detailed description of the invention.

DESCRIPTION OF THE PREFERRED EMBODIMENTS

Figure 1:
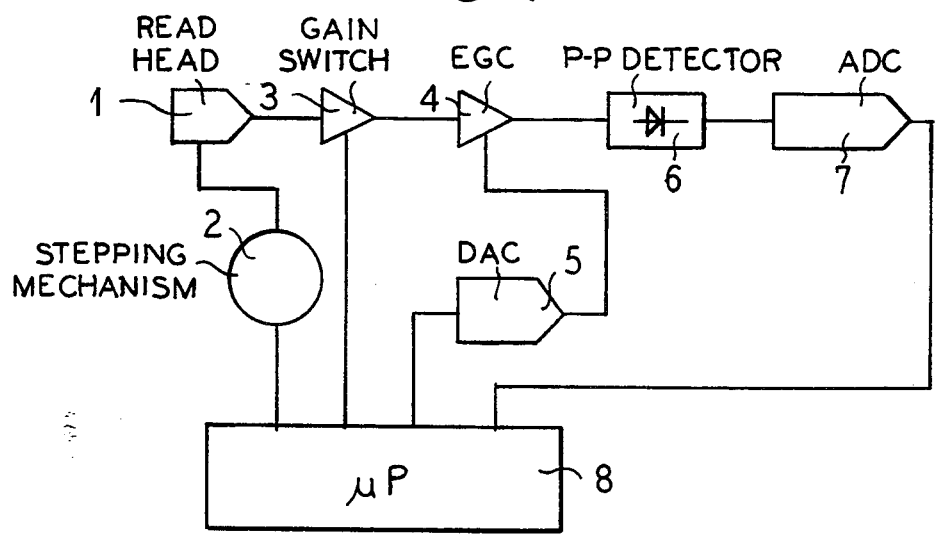
FIG. 1 is a schematic block diagram of a head positioning and read system for a tape drive unit, for implementing the method in accordance with the principles of the present invention.

An apparatus for practicing the method of the present invention is shown in FIG. 1. The apparatus includes a read head 1 which is movable relative to data tracks on a magnetic tape (not shown) by means of a stepping mechanism 2. The stepping mechanism 2 moves the read head in steps in a direction which is substantially perpendicular to the direction of tape transport, i.e., along the width of the tape. The read head 1 generates electrical signals corresponding to the contents of the data tracks, these electrical signals being supplied to a gain switch 3, which is digitally switchable between a fixed high gain and a fixed lower gain, the high gain being used when measuring at the edges of a track and the lower gain being used when measuring with the read head 1 completely within a track.

The output of the gain switch 3 is supplied to an electrical gain control (EGC) stage 4, which is analog-controlled by the output of a digital-to-analog converter (DAC) 5. The electrical gain control stage 4 has a number of available gain settings, so that the output of the read head can be selectively amplified to different levels. The output of the electrical gain control stage 4 is supplied to a peak-to-peak detector 6, the output of which is supplied to an analog-to-digital converter (ADC) 7. The output of the analog-to-digital converter 7 is supplied to a microprocessor 8, which undertakes the analysis and manipulation of the signals, now in digital form, read by the read head 1, in the manner described below. The microprocessor 8 also controls the stepping mechanism 2, the gain switch 3 and the digital-to-analog converter 5.

Figure 2:
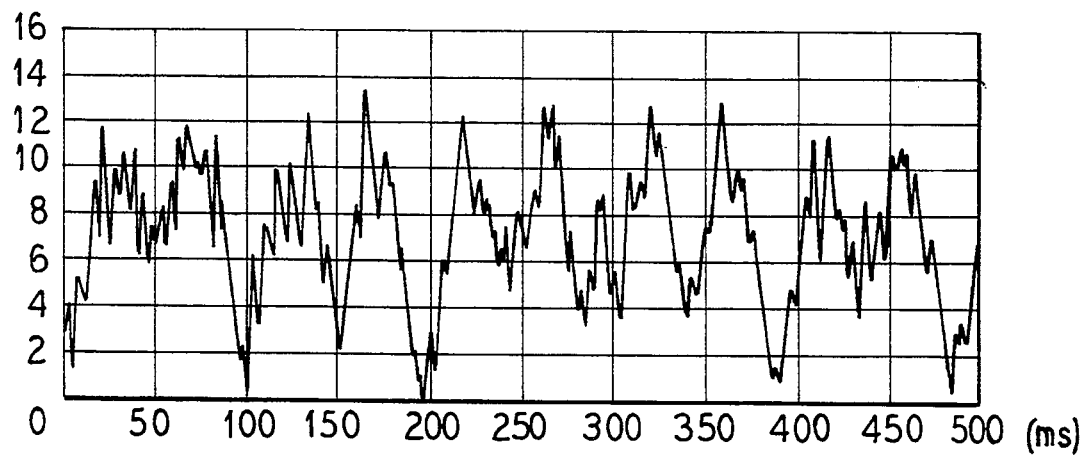
FIG. 2 is an example of the output of a read head showing typical tape wander at BOT.
Figure 3:
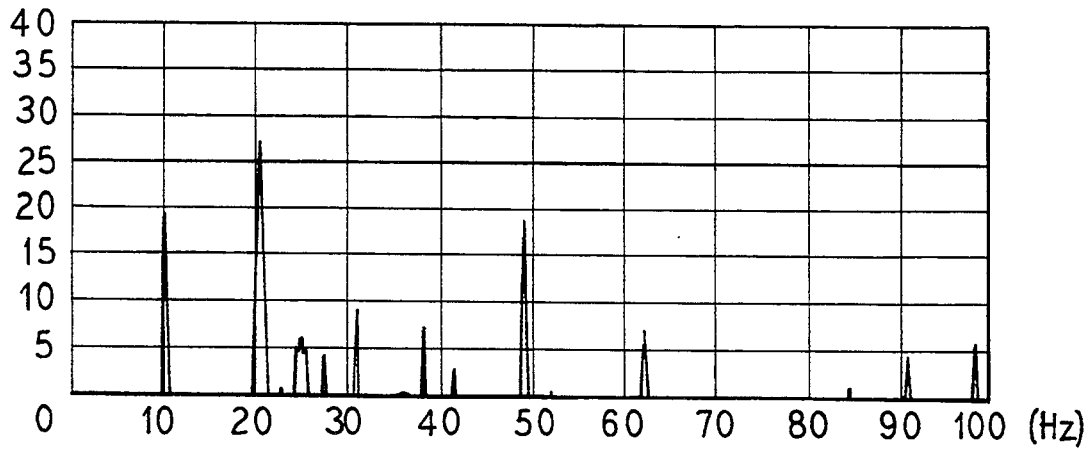
FIG. 3 is a spectral resolution of the graph of FIG. 2.

In operation, using the stepping mechanism 2, the read head 1 is positioned at the respective lower and upper edges of a data track to be read such that, at each of those positions, the read head 1 is positioned slightly into (over) the data track over an entire period of tape wander. The position of the read head 1, and the gain of the electronic gain control stage 4 are set by the microprocessor 8 so that the read electronics is not saturated over a period of tape wander. With the read head 1 positioned at these two positions, the output from the data track in question is measured over an integral number of tape wander periods. As noted above, the tape wander components are related to the rotating pans (not shown) of the data cartridge. Measurements undertaken for a large number of QIC cartridges from the four currently-existing manufacturers show that the fundamental component of tape wander at the beginning of tape (BOT) and end of tape (EOT) is independent of the cartridge vendor and is also independent of the tape length. The tape wander period has been found at BOT and EOT to correspond to a tape distance between 9 inches and 9.3 inches, and is typically 9.15 inches. A typical example of tape wander is shown in FIG. 2, as registered by the output of the read head 1. FIG. 2 shows tape wander at BOT with a tape speed of 96 IPS. The spectral resolution shown in FIG. 3 was obtained by subjecting the signal shown in FIG. 2 to a FFT.

By measuring the read head output over an exact multiple of tape wander periods, the average position of the track is found with high accuracy over a short distance. The output from the track is measured by the analog-to-digital converter 7 with a sampling rate which is higher than twice the highest tape wander component. The measurements obtained at the aforementioned two read head positions result in four variables: Lower Edge Position (LEP) and Upper Edge Position (UEP), obtained by a position signal supplied by the stepping mechanism 2 to the microprocessor 8 corresponding to the respective positions of the read head 1, and Lower Edge Output (LEO) and Upper Edge Output (UEO), which are the output signals obtained by the read head 1 at the respective upper and lower edge positions. Additionally, the read head 1 is positioned by the stepping mechanism 2 at a position approximately in the center of the track in question, and the output of the read head 1 at that location is measured and stored as a variable designated Center Output (CO). Since the width (RW) of the read head 1 is known, the output change versus position when the read head 1 is partially into the data track in question is found as:

Output versus Position=CO/RW.

After this relationship has been identified, either the upper or lower edge position can be corrected for the difference in output versus the output at the opposite edge. As noted earlier, the Upper Edge Position can be corrected as follows:

Corrected UEP=UEP+(UEO−LEO)/Output versus Position.

In this case, the upper edge position is corrected to a position which would have resulted in the same output as found at the lower edge. Thus, the variables UEO, LEO and Output versus Position can be used to calculate an upper edge position which is symmetrically into the track with respect to the lower position. The corrected upper position is thereby found independently of the stepper mechanism resolution.

The center position can then be calculated as the sum of the other edge position plus the corrected edge position, divided by two. In this example, therefore, the center position is calculated as follows:

Center Position=(LEP+Corrected UEP)/2.

The method disclosed herein has been experimentally implemented in a system having a stepper resolution of 5 μm (0.196 mil.) From a test series of 10 cartridges and 500 track seek operations on each cartridge, the standard deviation for the seeking operation was found to be 0.2 step (=1 μm=0.0392 mil), and the maximum and minimum positions were found at ±0.61 step (±3.05 μm=±0.117 mil) from the average position.

A typical seek procedure is as follows.

To increase the sensitivity of the read element 1 as a position sensor, the gain of the read channel is increased by a factor, by a fixed amount in the gain switch 3 by the microprocessor 8. The gain is preferably increased by an amount so that the typical tape wander peak-to-peak amplitude corresponds to an output change equal to the dynamic range of the read electronics. This means that the gain should be such that if the read head 1 is 16 μm (0.63 mil) into the data track (the typical tape wander being ±8 μm or ±0.315 mil), the read electronics should reach saturation.

The read head 1 is first positioned below the track in question. From this position, the read head 1 is moved upwardly until the output from the read head increases above the noise level; the output from the read head 1 will start to noticeably increase immediately when the read head 1 is within the track. With the read head 1 in this position, the output is measured over two periods of tape wander (18.3 inches). If at any time the output drops down to the noise level, the read head 1 is stepped one step further into the track. Similarly, if at any time the output reaches the saturation level of the electronics, the read gain should be reduced by a factor or approximately 30%. If either the read head 1 has to be stepped, or the gain of the electronic gain control stage 4 has to be reduced, the measurement period of two periods of tape wander is re-started. This method will typically bring the head to a position for measuring, with a suitable gain, during one period of tape wander (9.15 inches). The rest of the reference track (approximately 35 inches) is usable for averaging the tape wander.

When the average output from the read head 1 over two periods of tape wander is found, this output is stored as the variable Lower Edge Output (LEO) in a memory region of the microprocessor 8, or in a separate memory. The step position at that location is also stored as the variable Lower Edge Position (LEP). The tape at this point is rewound for the purpose of measuring the center output and the upper edge at the next pass. The read head 1 is then stepped up to a position approximately at the center of the track. The fixed gain increase is turned off, and the output of the read head 1 is measured as the variable Center Output (CO). To scale the variable CO to the edge outputs (i.e., LEO and UEO), the variable CO is set to be equal to the measured output multiplied by the fixed gain increase of the gain switch 3. The variable output versus position, when the read head 1 is partly into the data track in question, can now be calculated as the variable CO divided by the read head width RW, as noted above.

The fixed gain increase is then turned on again, and the read head 1 is stepped upwardly until the output thereof drops below the saturating value. With the read head 1 in this position, the output from the read head 1 is measured over two periods of tape wander (18.3 inches). If at any time the output increases to the saturating value, the read head 1 is stepped one step further out of the track, and the measurement period is restarted. This method will typically bring the read head 1 to a position for measuring during one period of tape wander (9.15 inches). Again, the rest of the reference track (approximately 35 inches) is usable for averaging the tape wander. Since the gain was adjusted at the lower edge to match the output from the track and the peak-to-peak amplitude value of the tape wander, the average amplitude found at the upper edge (UEO) will be fairly close to the variable LEO. The position of the read head 1 and the average output at the location are respectively stored as the variables Upper Edge Position (UEP) and Upper Edge Output (UEO). A corrected upper edge position (corrected UEP) is then calculated, which is that upper edge position which would result in an upper edge output equal to the measured variable (LEO). The corrected upper edge position is calculated as follows:

Corrected UEP=UEP+(UEO−LEO)/Output versus Position.

The center position is then calculated as follows:

Center Position=(LEP+Corrected UEP)/2.

The actual position of the center of the track in question can thereby be found independently of the stepper mechanism resolution.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for reading data from a data track on a magnetic tape comprising the steps of:
   transporting a tape having data tracks thereon past a read head in a tape transport direction, said tape exhibiting periodic tape wander as said tape is transported;

moving said read head in equal steps in a direction perpendicular to said tape transport direction to a first edge position partially over a first edge of a data track as said tape is transported and operating said read head to obtain an average output of said read head over an integral number of tape wander periods constituting a first output value;

moving said read head in equal steps in said direction perpendicular to said tape transport direction to a second edge position partially over a second edge of said data track as said tape is transported and operating said read head to obtain an average output of said read head over an integral number of tape wander periods constituting a second output value;

moving said read head in equal steps in said direction perpendicular to said tape transport direction to a position approximately midway between said first and second edge positions as said tape is transported and operating sid read head to obtain an average output of said read head constituting a center output value;

dividing said center output value by the width of said read head to obtain an output versus position value;

correcting one of said first or second edge positions by dividing the difference between said first and second output values by said output versus position value to obtain a quotient and adding said quotient to the one of said first or second edge positions to be corrected, to obtain a corrected edge position and thereby leaving the other of said first or second edge positions as an uncorrected edge position;

identifying a center of said data track by adding said corrected edge position to said uncorrected edge position to obtain a sum, and dividing said sum by two; and moving said read head in equal steps in said direction perpendicular to said tape transport direction to position said read head relative to said center and operating said read head to read data contained in said data track.

2. A method as claimed in claim 1 wherein said read head is connected to a processing circuit settable at a high gain and at a low gain for amplifying the output of said read head, said method comprising the additional steps of:

operating said processing circuit at said high gain when operating said read head to obtain said first and second output values;

operating said processing circuit at said low gain when operating said read head to obtain said center output value; and multiplying said center output value, obtained with said read head at said position approximately midway between said first and second edge positions, by the ratio of said high and low gains to obtain a scaled center output value; and using said scaled center output value as said center output value in the step of dividing said center output value by the width of said read head.

3. A method as claimed in claim 1 comprising the additional step of:

using 9.15 inches as a distance of tape travel during a tape wander period.

4. An apparatus for reading data from a data track on a magnetic tape comprising:

a read head;

means for moving a tape having data tracks thereon past said read head in a tape transport direction, said tape exhibiting periodic tape wander as said tape is transported;

head stepping means for moving said read head in equal steps in a direction perpendicular to said tape transport direction;

means for operating said head stepping means to move said read head in said direction perpendicular to said tape transport direction to a first edge position partially over a first edge of a data track as said tape is transported, and to subsequently move said read head in said direction perpendicular to said tape transport direction to a second edge position partially over a second edge of said data track as said tape is transported;

means for operating said read head at said first edge position to obtain an average output of said read head over an integral number of tape wander periods constituting a first output value, and for operating said read head at said second edge position to obtain an average output of said read head over an integral number of tape wander periods constituting a second output value;

means for operating said head stepping means to move said read head in said direction perpendicular to said tape transport direction to a position approximately midway between said first and second edge positions as said tape is transported;

means for operating said read head to obtain an average output of said read head constituting a center output value;

processing means for dividing said center output value by the width of said read head to obtain an output versus position value, and for correcting one of said first or second edge positions by dividing the difference between said first and second output values by said output versus position value to obtain a quotient and for adding said quotient to the one of said first or second edge positions to be corrected, to obtain a corrected edge position, and leaving the other of said first or second edge positions as an uncorrected edge position, and for identifying a center of said data track by adding said corrected edge position to said uncorrected edge position to obtain a sum, and for dividing said sum by two;

means for operating said head stepping mechanism to move said read head in said direction perpendicular to said tape transport direction to position said read head relative to said center; and means for operating said read head to read data contained in said data track.

5. An apparatus as claimed in claim 4 further comprising:

means for setting said processing means at a high gain and at a low gain for amplifying the output of said read head;

means for operating said processing means at said high gain when operating said read head to obtain said first and second output values;

means for operating said processing means at said low gain when operating said read head to obtain said center output value; and said processing means further comprising means for multiplying said center output value by the ratio of said high and low gains to obtain a scaled center output value, and for using said scaled centered output value as said center output value when dividing said center output value by the width of said read head.

* * * * *